UNITED STATES PATENT OFFICE.

RUDOLF TAMBACH, OF LUDWIGSHAFEN-ON-THE-RHINE, GERMANY, ASSIGNOR TO THE FIRM OF KNOLL AND COMPANY, OF LUDWIGSHAFEN-ON-THE-RHINE, GERMANY.

MEDICINAL EXTRACT OF APERIENT DRUGS.

1,167,230.　　　　　Specification of Letters Patent.　　Patented Jan. 4, 1916.

No Drawing.　　　Application filed July 29, 1909.　Serial No. 510,278.

*To all whom it may concern:*

Be it known that I, RUDOLPH TAMBACH, chemist, a subject of the German Emperor, residing at Ludwigshafen-on-the-Rhine, Germany, have invented certain new and useful Medicinal Extracts of Aperient Drugs, of which the following is a specification.

Extracts of rhubarb, senna leaves, aloe and similar materials are known, which are prepared by extracting the drugs in question with alcohol, with or without an addition of glycerin or the like and concentration. These form the so-called complete extracts, which contain all the constituents of the drug that are extractable by alcohol. Now a great portion of this sort of extracts consists of other substances, known as ballast substances, the presence of which prevents on the one hand the rapid assimilation of the active substances and on the other hand is likely to set up undesirable subsidiary reactions, which frequently forbid their use particularly with sensitive persons and with invalids as a rule. For this reason search has repeatedly been made for purified extracts which shall be free from chlorophyll, pectin substances, soluble vegetable albumen, sugar and inorganic salts, the presence of which favors the growth of vegetable microörganisms and is capable besides of acting destructively upon the desired substances. Extracts of this kind are particularly valuable, when drugs are employed, from which it has not hitherto been possible to isolate all the active substances. To this class belong the aperient drugs, such as rhubarb, cascara bark, senna leaves, aloe, buckthorn bark. Tschirch, (*Chem.* *Centralbl.*, 1904, I, 1666), assumes, that the action of the drugs aloe, rhubarb, buckthorn and senna leaves depends upon the amount of oxymethylanthraquinone, which they contain. The substances of this composition extracted therefrom have not, however, been able to displace the drugs themselves, and their extract has always been resorted to again.

It has now been found, that a great portion of the ballast substances can be removed from the alcoholic extracts of the above drugs by treatment with ether. The solutions obtained by this treatment are concentrated and adjusted to a fixed strength of action with milk sugar or some other suitable vehicle.

Example I: 1 kilogram of rhubarb is extracted twice with 5 liters of alcohol each time, and the extract either immediately or after being concentrated treated with ether as long as a precipitate is produced. This precipitate is filtered off, the clear solution freed from ether and spirit by distillation and the residue made up to a fixed weight with milk sugar. In this way a yellow powder, not completely soluble in water, but very easily soluble in dilute alkali with a deep red color, is obtained and which does not upset the stomach and is very easily absorbed in the intestines.

Example II: 1 kilogram of cascara bark is extracted twice with 5 liters of alcohol each time and then treated as in Example I. The product obtained by this treatment likewise forms a yellow powder insoluble in water and in dilute acids, but soluble in alkalis with a light red color.

Example III: 1 kilogram of senna leaves is extracted twice with 5 liters of alcohol each time, after which the extracts are concentrated and treated with ether. After the precipitates thereby produced have been removed, the solutions are again highly concentrated, then treated with petroleum ether to remove the chlorophyll and finally evaporating to dryness and mixed with milk sugar. There remains behind a yellow powder insoluble in water and dilute acids, but soluble in alkalis with a yellow color. The product obtained from senna is the preferred one and its production is distinguished by the following physical and chemical properties: The aqueous extract of the product does not reduce Fehling's solution nor assume any coloration on shaking with ether. Addition of ammonia to the etheric solution yields a precipitate with sulfuric acid and also with acetate of lead, and on evaporation yields a residue soluble in concentrated sulfuric acid and producing a dark colored solution, a drop of which when poured into water and supersaturated with ammonia produces a muddy green color. The part of the product obtained from senna and insoluble in water is soluble in alcohol with a dark color and is capable of separation from such solution by acids, the said part being moreover insoluble in glacial acetic acid, and sparingly soluble in alcohol, benzene and other inert solvents.

Example IV: 1 kilogram of aloe is extraced twice with 5 liters of alcohol each time. The alcoholic extracts, after being concentrated, are treated with ether, and the solutions after being separated from the precipitates formed are filtered, evaporated to dryness and mixed with milk sugar. Buckhorn bark may be treated in the same way. Instead of ethyl alcohol other alcohols or solvents of a similar nature such as methyl-alcohol and acetone may be used, and instead of ether, petroleum ether or some similar precipitants may be employed.

What I claim is:—

1. The process for the manufacture of purified extracts of aperient drugs, the active constituents of which belong to the class of oxymethyl-anthraquinones and which on the extraction of the drug with alcohol are soluble without alteration, which consists in preparing an alcoholic extract from the same, treating the extract with ether as long as a precipitate is formed, concentrating the same by evaporation, and adding a suitable diluent, sufficient in quantity to obtain the desired strength, substantially as described.

2. The process for the manufacture of purified extracts of aperient drugs, the active constituents of which belong to the class of oxymethyl-anthraquinones and which on the extraction of the drug with alcohol are soluble without alteration, which consists in preparing an alcoholic extract from the same, treating the extract with ether as long as a precipitate is formed, concentrating the same by evaporation, and adding sufficient milk sugar to obtain the desired strength, substantially as described.

3. As a new product, an extract of an aperient drug, whose active constituent belongs to the class of oxymethyl-anthraquinones and is obtainable in the manner described, the said extract containing almost the whole of the active constituents in unaltered condition free from most of the superfluous other constituents and being diluted with milk sugar in any desired proportion.

In testimony whereof I have hereunto set my hand in presence of two subscribing witnesses.

Dr. RUDOLF TAMBACH.

Witnesses:
 H. TAEGER,
 ERNEST L. IVES.